United States Patent [19]

Ohbayashi

[11] Patent Number: 5,011,570

[45] Date of Patent: Apr. 30, 1991

[54] ID CARD, ID BOOKLET, AND MANUFACTURING METHOD THEREOF

[75] Inventor: Keiji Ohbayashi, Hino, Japan

[73] Assignee: Konica Corporation, Tokyo, Japan

[21] Appl. No.: 435,945

[22] Filed: Nov. 13, 1989

[30] Foreign Application Priority Data

Nov. 21, 1988 [JP] Japan ................................ 63-293977

[51] Int. Cl.$^5$ ................................................ B32B 7/00

[52] U.S. Cl. ...................................... 156/310; 40/626; 40/630; 156/182; 156/235; 156/308.2; 283/77; 428/200; 428/916; 430/14; 430/18

[58] Field of Search ............ 156/182, 310, 235, 308.2; 40/626, 630; 428/200, 916; 430/14, 18; 283/77

[56] References Cited

U.S. PATENT DOCUMENTS 4,322,461 3/1982 Raphael et al. ........................ 283/77

*Primary Examiner*—John J. Gallagher

*Attorney, Agent, or Firm*—Frishauf, Holtz, Goodman & Woodward

[57] ABSTRACT

An identity card in which a first image recording layer comprising a colorant capable of absorbing light of a visible wavelength region provided on a first support and a second image recording layer comprising a colorant capable of absorbing light of an infrared wavelength region provided on a second support are adhered to each other in face-to-face contact to form a laminated structure highly resistant to alteration and/or forgery.

20 Claims, 3 Drawing Sheets

ID CARD, ID BOOKLET, AND MANUFACTURING METHOD THEREOF

FIELD OF THE INVENTION

The present invention relates to an identity (hereinafter referred to as ID) card and an ID booklet. More particularly, it is concerned with an ID card and an ID booklet that are used for identifying the bearer as a particular person, as exemplified by a member certificate or a student certificate.

BACKGROUND OF THE INVENTION

So-called ID cards such as member certificates and student certificates that indentify the bearers as particular persons have been hitherto used. Various personal data such as a photograph of the bearer's face, and an address, membership, or personal code number of the bearer are recorded in, or stuck on, such ID cards so that a person can be confirmed to be the person himself or herself.

Such ID cards satisfactorily function when they are used in normal forms. However, if, for example, they have been lost, the ID cards of this type, whose photograph can be peeled with ease and its mount and another photograph can be available in general, are sometimes misused, e.g., altered by replacing the photograph or forged through an illegal channel, causing social problems.

To cope with this, a measure has been hitherto taken, for example to affix a seal or stamp over the photograph of a face when the ID cards are prepared. In replacement thereof, it has become prevalent in recent years to record all the data such as the face and characters on a color photographic paper, a heat-sensitive color recording material or the like, and hold the color photographic paper between laminate materials not usually available, e.g. watermarked materials, to heat-bond the laminate materials with a hot melt or adhere them with a pressure-sensitive adhesive.

In this way, it is presently prevalent to prepare ID cards by laminating the color photographic paper, heat-sensitive color recording material or the like. This means, however, still can not effectively prevent the forgery or alteration of ID cards. That is to say, such light-sentive materials are commonly available, and hence even a nonprofessional can forge ID cards if, for example, a pattern of the desired ID card is previously prepared through any means, which is then photographed and printed in a given size. In the conventional methods of making the ID cards, forgery and alteration cannot be satisfactorily prevented, unsatisfactorily, and more effective means for preventing the forgery or alteration has been sought.

On the other hand, it is also common to keep a bar code or optically readable characters recorded on an ID card, and optically read these to judge the ID card. In this system of optically reading the information, ID cards operable in various spectral regions are used as described, for example, in JIS C6253-1983. In particular, however, the bar code or the characters read by an optical character reader (hereinafter "OCR") must have a sufficient light-absorbing ability to infrared light so that an OCR having spectral light mainly in infrared wavelength regions can be operated to perform normal reading.

In the ID cards, usually, photographs of the bearer's face are recorded, and are particularly required to be able to visually indentify the persons themselves with ease. Hence, for such identification, a color recording material with a high image quality may preferably be used at the part of a the photograph of face. The high image quality herein mentioned refers to a high resolving power as exemplified by a resolving power of about not less than 8 dots per 1 mm, and means that the recording material can continuously change its gradation or has a gradation of not less than 32 gradations, and preferably not less than 64 gradations.

Those preferably used as such recording materials include silver salt color recording materials employing a silver halide or those so called as sublimation dye thermal transfer recording materials.

The above silver salt color recording materials or sublimation dye thermal transfer recording materials, however, are comprised of a colorant which is a dye. Hence, they have insufficient absorbance to infrared light and therefore, in order to enable reading with an infrared OCR, it becomes necessary to record an image by a method that enables reading with the infrared OCR.

With such an aim, the present inventors have attempted various methods, where an image was recorded on a recording material on which a color image has been recorded, according to a method of recording characters capable of being read by the infrared OCR, and the resulting recording material was laminated on its surface with a laminate material to prepare an ID card. Nothing, however, was obtained without a high possibility of alteration (in other words, readiness in the peeling of laminate surfaces), and also with a high image quality for either the color image such as the photograph of a face or the characters to be read by an OCR.

SUMMARY OF THE INVENTION

The present invention was made on account of such circumstances. Accordingly, an object of the present invention is to provide an ID card that can more effectively prevent alteration or forgery and on which both the characters readable also by an infrared OCR and the photograph of face can be obtained with a high image quality, and an ID booklet having such an ID card.

The above object of the present invention can be achieved by an ID card in which a first image recording layer comprising a colorant capable of absorbing light of a visible wavelength region provided on a first support, and a second image recording layer comprising a colorant capable of absorbing light of an infrared wavelength region provided on a second support, are adhered to each other.

A first image recording layer comprising a colorant capable of absorbing light of a visible wavelength region provided on a first support, of the present invention, may preferably be a recording layer in which an image dye has been thermally transferred to an image-receiving layer having a dye receptivity. There may preferably be used a recording layer in which an image is recorded on an image-receiving layer, using a sublimation color thermal transfer recording material or a heat-development silver salt color recording material as disclosed in Japanese Patent Publication Open to Public Inspection (hereinafter referred to as Japanese Patent O.P.I. Publication) No. 88550/1988 or Japan Photographic Society, Vol. 50, No. 5, pp.397–408 (1987).

As other image recording means used in the first recording material, recording can be carried out, for example, by thermofusible ink transfer recording, or using an ink-jet system, an eletrophotographic system, etc.

A second image recording layer comprising a colorant capable of absorbing light of an infrared wavelength region provided on a second support, of the present invention, may preferably be a recording material in which a record is made using a recording material printed by type or a thermofusible ink transfer recording material.

In the ID card or ID booklet of the present invention, image-recorded surfaces of the above first recording layer and second recording layer may be adhered to each other by optionally interposing an adhesive layer or a pressure-sensitive layer. Images can be thus recorded. In this instance, from the viewpoint of preventing alteration of the ID card and ID booklet, the image-recorded surfaces of the two recording layers may preferably be laminated in such a manner that they face each other.

DETAILED DESCRIPTION OF THE INVENTION

Figure 1:
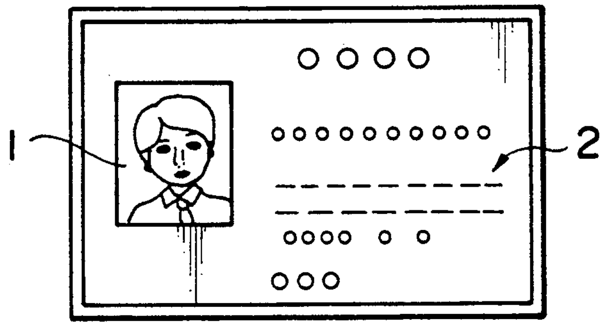
FIG. 1 is a front elevation of an ID card according to the present invention.

The recording layers preferably used in the present invention will be described below.

The sublimation color thermal transfer recording material (hereinafter "sublimation thermal recording material") is comprised of an ink sheet comprising a support having thereon each of cyan, magenta and yellow dyes (and optionally a black dye used alone or comprising a combined dye), and an image-receiving material comprising another support having thereon a thermoplastic resin layer capable of receiving the dyes. When image recording is carried out, the dye surface of the above ink sheet and the thermoplastic resin layer of the image-receiving material are made to face each other, heat energy is applied from the back side of the ink sheet by means of a thermal head on the basis of image information, and the dyes are transferred from the ink sheet on the thermoplastic resin layer or in the resin layer, so that an image is recorded. This method is described, for example, in Electrophotographic Society, Vol. 27, No. 2 (1988), pp. 385-371.

The dyes used in the above ink sheet may preferably include, for example, Miketon Polyester Yellow YL (a product of Mitsui Toatsu Chemicals, Inc.; C.I. Disperse Yellow 42), Miketon Polyester Yellow 5G (a product of Mitsui Toatsu Chemicals, Inc.; C.I. Disperse Yellow 5), Kayaset Yellow G (a product of Nippon Kayaku Co., Ltd.; C.I. Solvent Yellow 77), Kayaset Yellow A-N (a product of Nippon Kayaku Co., Ltd.; C.I. Solvent Yellow 125(s)), PTY-52 (a product of Mitsubishi Chemical Industries Limited; C.I. Disperse yellow 14-1, TPY-56 (a product of Mitsubishi Chemical Industries Limited; C.I. Disperse Yellow 3), Miketon polyester Red BSF (a product of Mitsui Toatsu Chemicals, Inc.; C.I. Disperse Red 111), Miketon Polyester Red T3B (a product of Mitsui Toatsu Chemicals, Inc.; C.I. Disperse Red 228(s), Kayaset Red B (a product of Nippon Kayaku Co., Ltd.; C.I. Disperse Red 135), Kayaset Red 126 (a product of Nippon Kayaku Co., Ltd.; C.I. Disperse Red 4), PTR-54 (a product of Mitsubishi Chemical Industries Limited; C.I. Disperse Red 50), PTR-63 (a product of Mitsubishi Chemical Industries Limited; C.I. Disperse Red 60), Miketon Polyester Blue FBL (a product of Mitsui Toatsu Chemicals, Inc.; C.I. Disperse Blue 56), Discharge Blue R (a product of Mitsui Toatsu Chemicals, Inc.; C.I. Disperse Blue 106), Mitsui PS Blue 3R (a product of Mitsui Toatsu Chemicals, Inc.; C.I. Disperse Blue 33), PTB-67 (a product of Mitsubishi Chemical Industries Limited; C.I. Disperse Blue 241), PTB-77 (a product of Mitsubishi Chemical Industries Limited; C.I. Solvent Blue 90), Kayaset Blue 906 (a product of Nippon Kayaku Co., Ltd.; C.I. Solvent Blue 112, and Kayaset Blue 141 (a product of Nippon Kayaku Co., Ltd.; C.I. Solvent Blue 114(S)).

A basic dye may include, for example, methine (cyanine) basic dyes of a monomethine type, dimethine type or trimethine type, such as 3,3'-diethyloxathiacyanine iodide, Astrazone Pink FG (a product of Bayer AG; C.I. 48015), 2,2'-carbocyanine (C.I. 808), Atlas Phyoxine FF (C.I. Basic Yellow 21), Aizen Katiron Yellow 3GLH (a product of Hodogaya Chemical Co., Ltd.; C.I. 480 Kayaset), and Aizen Katiron Red 6BH (a product of Hodogaya Chemical Co., Ltd.; C.I. 4820); diphenylmethane basic dyes such as Auramine (C.I. 6 Kayaset); triphenylmethane basic dyes such as Malachite Green (C.I. 42000), Brilliant Green (C.I. 42040), Magenta (C.I. 42510), Methyl Violet (C.I. 42535), Crystal violet (C.I. 684), and Victoria Blue B (C.I. Disperse 045); xanthene basic dyes such as Vinylon G (C.I. 739), Rhodamine (C.I. 45170),, and Rhodamine 6G (C.I. 45160); acrydine basic dyes such as Acrydine yellow G (C.I. 785), Leonin AL (C.I. 46075, Benzoflavin (C.I. 791), and Affin (C.I. 46045); quinoneimine basic dyes such as Neutral Red (C.I. 50040), Astrazone Blue GBE/×125% (C.I. 51005). and Methylene Blue (C.I. 52015); and other basic dyes such as anthraquinone basic dyes having a tertiary amine. It may further include C.I. Disperse Violet 26, C.I. Solvent Blue 63, and C.I. Solvent Blue 36.

Particularly preferred examples of the sublimation dyes include, for example, the following compounds.

(Magenta)

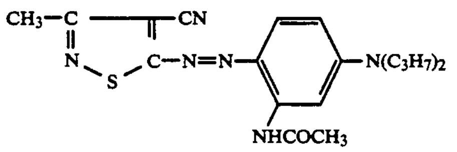

M-1

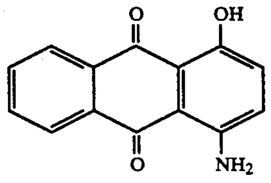

M-2

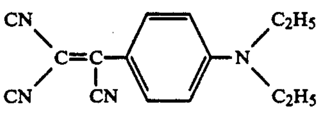

M-3

-continued (Yellow)

Y-1

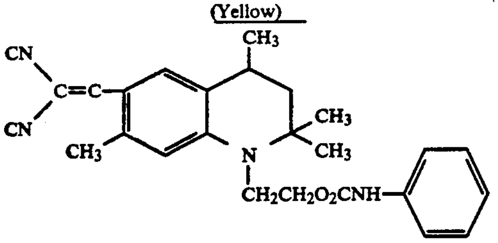

Y-2

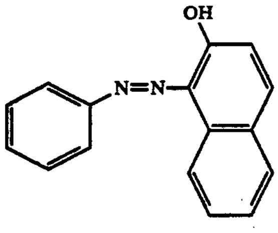

Y-3

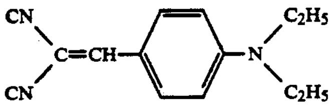

(Cyan)

C-1

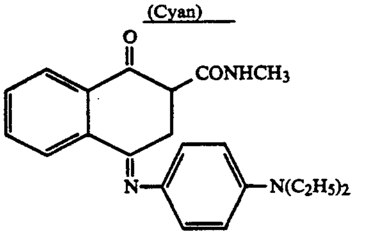

C-2

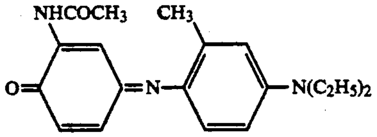

C-3

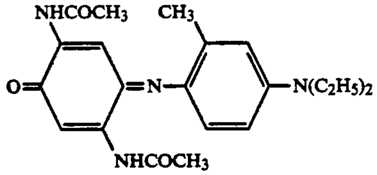

C-4

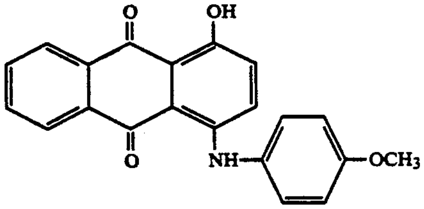

Binders to hold the above sublimation dyes include, for example, cellulose resins such as ethyl cellulose, hydroxyethyl cellulose, hydroxy ethyl cellulose, hydroxy cellulose, hydroxypropyl cellulose, methyl cellulose, cellulose acetate, and cellulose butyrate; and vinyl resins such as polyvinyl butyral, polyvinyl acetal, polyvinyl pyrrolidone, polyester, polyacryalmide, and polyphenylene oxide.

The support that constitutes the ink sheet includes, for example, papers or films such as condensor paper, polyester film, polystyrene film, polysulfone film, polyimide film, polyvinyl alcohol film, and cellophane. It may have a thickness of from 3 to 50 μm, and preferably from 3 to 15 μm. Of these papers or films, condensor paper is used when inexpensiveness and heat resistance before treatment are required. On the other hand, a polyethylene terephthalate or polyethylene-2,6-diphthalate support is particularly preferably used when importance is given to the requirements that the recording material has a high mechanical strength, may not be broken during its handling in preparing ribbons or its travelling through a thermal printer, and has a flat surface.

The ink sheet is provided on its back side with a slippery layer so that the ink sheet may be prevented from being stuck to the thermal head at the time of heating. The slippery layer may preferably contain a lubricant of various types, or a matting agent such as silica so that the contact area can be lessened.

Materials used as the image-receiving layer of the dye-receiving material used in pairs to the above ink sheet are polycarbonate, polyester, polyurethane, polyvinyl chloride, poly(caprolactam), copoly(styrene-acrylonitrile), etc.

Of these polymers that constitute the image-receiving layer, polymers having a number average molecular weight of from 500 to 1,000,000 are commonly used, within the range of which they are appropriately selected and put into use. Polymers having a number average molecular weight of from 10,000 to 500,000 are receiving layer may be from 1 to 50 $g/m^2$, and preferably from 2 to 25 $g/m^2$.

Materials used for the support of the image-receiving material ere papers, synthetic papers (laminated papers), aluminum foil, acetylcellulose film, cellulose triacetate film, polyester, etc., which may be of either reflection type or transparent type, but a transparent polyester film is preferred as described later.

Next, the heat-development silver salt color recording material used as the recording material having the first recording layer in the present invention will be described. The heat-development silver salt color recording material comprises a support and provided thereon by coating at least three light-sensitive layers containing a light-sensitive silver halide, a reducing agent, and a yellow, cyan or magenta dye-providing substance, and another support having thereon an image-receiving layer capable of receiving the dyes. This image-receiving layer is used as the present first image recording layer. The light-sensitive material is exposed to light using any sort of exposure units such as a laser on the basis of image information, and then the surface of the light-sensitive layer of the light-sensitive material is laid overlapping on the surface of the image-receiving layer of the image-receiving material, followed by heating and pressing, so that the heat-development dye transfer can be carried out. The outline of this procedure is described in the above publications together with the outline of its constitution and process. Details thereof are also disclosed in Japanese Patent O.P.I. Publications No. 144350/1088 and No. 193844/1989.

The light-sensitive material may preferably comprise a support and provided thereon at least three light-sensitive layers (e.g., infrared-sensitive, red-sentive, and green-sensitive layers) each containing a polymer coupler as a dye-providing substance, a light-sensitive silver halide, an organic silver salt, a p-(N',N'-dialkylamino)-phenylsulfamate (a color developing agent precursor), a thermal solvent, and a binder (such as gelatin).

The polymer coupler that can be preferably used is the compound as disclosed in Japanese Patent O.P.I. Publication No. 193844/1989. The light-sensitive silver halide used is silver halides each having an average grain size of from 0.05 to 0.5 μm and having independently different color sensitivity. In addition to such silver halide grains, an organic silver salt may preferably be used. Such an organic silver salt preferably used includes silver benzotriazole, silver 5-methylbenzotriazole, silver benzimidazole, silver benzothiazole, silver acetylide, silver salts of acetylene derivatives, and silver behenate.

The thermal solvent preferably used is in the form of a solid at room temperature, and melts at the time of heat development, which includes, for example, benzamides such as p-toluamide, p-n-butoxybenzamide, p-(2-butanoyloxy)ethoxybenzamide, and p-n-butoxyphenylurea.

The binder used in the light-sensitive layer may preferably include gelatin. Other binders, however, may be also preferably used, as exemplified by gelatin derivatives, polyvinyl pyrrolidone, and polyvinyl alcohol.

In the above light-sensitive material, various known photographic additives can be appropriately used.

The image-receiving layer used in combination with the above light-sensitive material has substantially the same constitution as the above sublimation thermal recording material. The image-receiving layer may be selected taking account of the adaptability to the light-sensitive material, but may preferably be selected from polycarbonate, polyester, and polyvinyl chloride.

The support may also be selected from the same supports as those for the above sublimation thermal recording material. However, preferably used is a transparent polyester support with a thickness of from 30 to 200 μm. The recording layer on which an image has been recorded using the above-described sublimation thermal recording material or heat-development silver salt color recording material is used as the first recording layer of the present invention. This is preferably used for recording the photograph of a face, color patterns or various color images. It, however, can also record information of characters in part, of personal data, or the like.

The second recording layer of the present invention will now be described. The second recording layer of the present invention is a recording material in which a record is printed by type or a recording material in which a record is made using a thermofusible ink transfer recording material.

The recording layer obtained using the thermofusible ink transfer recording material follows the same process as that employed in the sublimation thermal recording material, using an ink sheet comprising a support having thereon a colorant and a heat-fusible substance. Thus, an image can be obtained on an image-receiving material by thermal transfer.

In the present invention, the colorant used in the thermofusible ink transfer recording material has a light-absorbing power or light-reflecting power in the infrared region. The infrared region herein mentioned refers to a wavelength region of from about 700 to 1,000 nm. The colorant of the present invention has a light-absorbing power in this region. The colorant that can be used includes inorganic pigments or organic pigments such as metals and metallic oxides. Carbon black or metals may preferably be used as the colorant. This is necessary to enable achievement of reading with an infrared OCR. The metals may include fine-powdery iron, copper, aluminum, nickel, lead, zinc, barium, tin, silver, etc. However, carbon black is preferred as the colorant in the present invention.

The heat-fusible substance may preferably include substances having a melting point or softening point of from 60° to 150° C., specifically including all sorts of waxes as exemplified by petroleum waxes such as carnauba wax, paraffin wax, microcrystalline wax, auricury wax, ester wax, and wax oxide; mineral waxes such as ozokerite, and ceresine; higher resin acids such as palmitic acid, and stearic acid; higher alcohols such as plamityl alcohol, stearyl alcohol, and behenyl alcohol; esters of higher fatty acids such as cetyl palmitate, myricyl palmitate, cetyl stearate, and myricyl stearate; amides such as acetamide, propionic acid amide, palmitic acid amide, and stearic acid amide; polymeric compounds such as ester gum, rosin maleic acid resin, rosin phenol resin, phenol resin, terpene resin, cyclopentadiene resin, and aromatic resins; and higher amines such as stearylamine. These are used alone or by mixture of two or more kinds.

Of these, preferred are waxes having a melting point of from 60° to 120° C. when measured using Yanagimoto JP-2 Type. This heat-fusible substance used in the thermofusible ink sheet may be contained in a proportion usually ranging from 5 to 80%, and preferably ranging from 10 to 40%.

A thermoplastic resin may optionally be used as a binder in the thermofusible ink sheet.

Examples of the thermoplastic resin may include resins such as ethylene copolymers, polyamide resins, polyester resins, polyurethane resins, polyolefin resins, acrylate resins, vinyl chloride resins, cellulose resins, rosin resins, ionomer resins, and petroleum resins; elastomers such as natural rubber, styrene butadiene rubber, isoprene rubber, chloroprene rubber, and diene copolymers; rosin derivatives such as ester gum, rosin maleic acid resin, rosin phenol resin, and hydrogenated rosin; and polymeric compounds having a softening point of from 50° to 150° C., such as phenol resin, terpene resin, cyclopentadiene resin, and aromatic hydrocarbon resins.

As the second support, any materials such as papers, polyesters, polyimides, and metallic foils can be used. However, paper supports or white polyesters are preferably used.

When the first image-recorded recording layer and the second image-recorded recording layer are laminated, known adhesives are used, or, alternatively, the two image-recorded recording layers are directly heat-sealed.

The adhesives used in the present invention are described, for example, in KAGAKU BENRAN (Chemical Handbook), Practical Course, The Revised Third Edition, published by Maruzen, 1980, pp.897–903, and the Technique Series "SECCHAKU (Adhesion)", compiled by Shozaburo Yamaguchi, Asakura Shoten, 1981, pp.20–38. The adhesives preferably used in the present invention include hot-melt adhesives as exemplified by an ethylene/vinyl acetate copolymer, and polyethylene, polyamide or polyester resins; thermoplastic resin adhesives as exemplified by a vinyl acetate type, a chloroprene type, and an acrylic emulsion type: rubber adhesives such as a chloroprene rubber type; thermo-curing resin adhesives such as a urea resin type, a melamine resin type, a phenol resin type, an epoxy resin type, and a polyurethane resin type; and photocuring resin adhesives; natural product adhesives such as gelatin, starch, and glue.

In the ID card or ID booklet of the present invention, at least one of the first recording layer and second recording layer may preferably be provided on its image-recording layer with an adhesive layer or a pressure-sensitive adhesive layer. The adhesive layer may be provided before the image recording, or may also be provided after the image recording. More preferably, the image-recording layer may be provided with a hot melt layer that can achieve adhesion under application of heat or may be provided with a heat-sealing layer. This hot melt layer or heat-sealing layer can serve as the image-recording layer by itself, so that any particular adhesive layer is not additionally required when it is used as the second image-recording layer. In particular, it is preferred from the viewpoint of preventing alteration and forgery to use the second recording layer having on its support the heat-sealing layer as the image-recording layer. The heat-sealing layer herein mentioned refers to a layer that can achieve heat-sealing to the binder of the image-receiving layer at least in part, in the state that no particular adhesive is used, when it is laminated on the image-receiving layer under application of heat and pressure. The support itself can also serve as the heat-sealing layer. The binder used in the heat-sealing layer may preferably be a thermoplastic resin, and may be any of those which can be melted and mixed with the binder of the image-receiving layer under application of heat. In a preferred embodiment, the binder of the image-receiving layer and the heat-sealing layer of the second recording layer are both comprised of thermoplastic resins, and the repeating units included in the chemical structural formulas of the respective resins are identical at least in part. In the present invention, preferably used as the binder in the image-receiving layer and the thermoplastic resin used in the heat-sealing layer of the second recording layer are polycarbonates, polyacrylates, polyesters, polyvinyl chlorides, etc. Polyvinyl chlorides are particularly preferred. The heat sealing, carried out under application of heat, is carried out by internal heating or external heating. The internal heating includes the means that employ ultrasonic waves, high frequency oscillations, microwaves, etc. Particularly preferred are ultrasonic waves or high frequency oscillations, which can readily melt, join and integrate the contact area of the two image-recording layers. The external heating also includes the means that employ a heat roller, infrared rays, a heat seal, a laser, etc.

The temperature, pressure and time used in the heat sealing may vary over a vast range depending on the manner of heat sealing. In general, the heat sealing may be carried out at a temperature of from 80° to 180° C., and at a pressure of from 0.1 to 100 kg, and preferably from 0.2 to 30 kg, per 1 cm$^2$. heat sealing may be also carried out in a time of from 0.01 to 30 seconds, and preferably from 0.1 to 10 seconds, per one portion.

The heat sealing may be carried out at any portion which is part or the whole of the contact area of the two image-recording layers. For example, in the instance of the ID card, the heat sealing may be effected at the whole region at its peripheral area, at part of the peripheral area, or at the whole surface of the image-recording layers or part thereof. The heat sealing, however, may preferably be effected at the whole area over which the two image-recording layers come into contact.

In the ID card of the present invention, the information of characters is recorded on the second image-recording layer different from the first recording layer, preferably by melt thermal recording to obtain an ID card with a high image quality. In this instance, what is particularly important is the smoothness of the surface of the first image-receiving layer and the surface of the second image-receiving layer. It is particularly important to make higher the smoothness of the first image-receiving layer surface than that of the second image-receiving layer surface.

It is preferred that the first recording material has an image-receiving layer that may give a high degree of flatness, and the first image-receiving layer surface has a smoothness of not less than about 500 seconds according to the Beck's smoothness as defined by JIS, p-8119. It is also preferred that the second image-receiving layer surface has such a smoothness that the surface is roughened to have a center face average roughness of not more than 0.5. The center face average roughness (SRa) herein mentioned is based on the following definition: When the part of an area $S_M$ on the center face is extracted from the roughness curved surface, an axis that falls at right angles with the center face of the extracted part is assumed as a Z axis and the roughness curved surface is represented by Z=f(X,y), the center face average roughness (SRa) is given by the following equation.

$$SRa = 1/S_M \int_0^{L} Y \int_0^{L} X|f(X,Y)|\,dxdy$$

where $L_Y L_X = S_M$.

The center face average roughness (SRa) of the image-receiving layer can be measured in the following way: Using a three-dimensional roughness analyzer SPA-11, Surfcorder SE-30H, and 3D Controller AK-11, which are manufactured by K.K. Kosaka Kenkyusho, the roughness curved surface is measured with a pitch of 10 μm on an area of 5 mm$^2$ by use of a diamond needle of 4 μm in diameter. In this measurement, the cut-off value (λc) is set to be 0.8 mm, and the feed rate, 0.5 mm/sec.

A method of preparing the ID card of the present invention will be described below with reference to the accompanying drawings.

Figure 3:
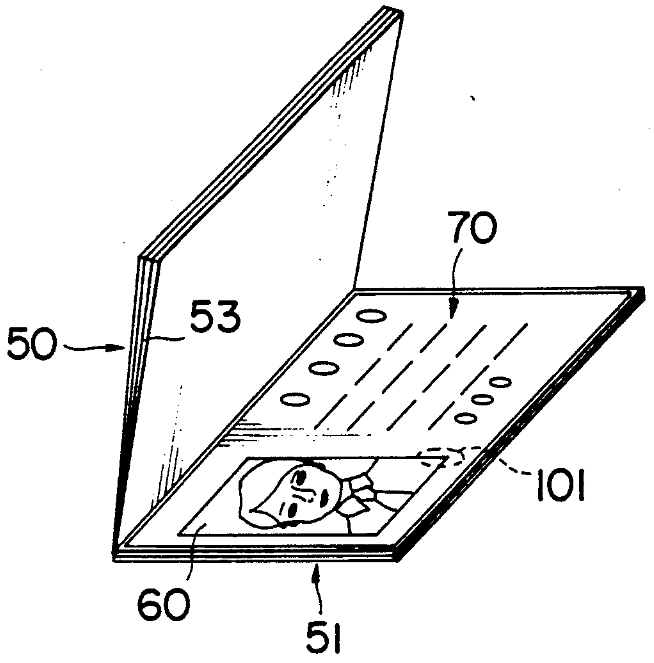
FIG. 3 is a perspective view of the ID booklet of the present invention.

FIGS. 1 and 3 illustrate finished ID card and ID booklet of the present invention, respectively. In the ID card, personal data such as name, address and membership, or common data 2 or 70 such as name of company or name of school and date of issuance are set out as character information together with image information such as the photograph of face 1 or 60.

Figure 2:
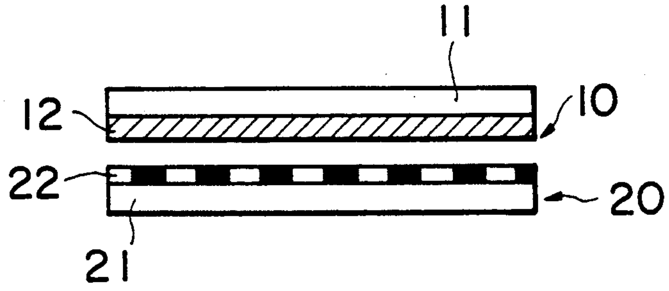
FIG. 2 illustrates an example to prepare the ID card according to the present invention.
Figure 4:
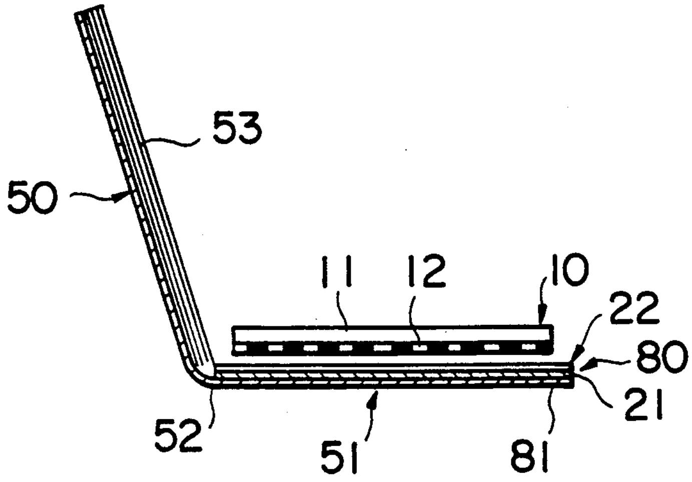
FIG. 4 illustrates an example to prepare the ID booklet.

FIGS. 2 and 4 each illustrate the state in which the ID card or ID booklet has not been finished (i.e., has not been laminated). The ID card (or ID booklet; hereinafter, both are called "ID card" together) is formed by lamination of the two image-recorded recording materials. In FIG. 2, a color image such as the photograph of a face is recorded on the the first image-recording material 10, using the sublimation thermal dye recording material or the heat-developable silver salt recording material comprising a colorant capable of absorbing light of a visible wavelength region. The information of characters or the like is recorded on the second image recording material 20, using the thermofusible ink transfer recording material comprising a colorant capable of absorbing light of an infrared wavelength region.

The image-recording material 20 comprises a reflective support 21 and provided thereon a thermoplastic resin layer 22 serving as the image-receiving layer (made of polyvinyl chloride). The image-recording material 10 comprises a transparent polyester support 11 and provided thereon an image-receiving layer 12 (made of polyvinyl chloride). After the images have been recorded on the image-recording material 10 and image-recording material 20, both are heated for 2 seconds at 120° C. for contact bonding, so that the ID card integrally formed of the two image-recorded recording materials can be obtained.

On the other hand, in FIG. 4, a cover 52 is formed, for example, with a plastic sheet that may not be readily broken. This plastic sheet is folded so that one half thereof may constitute a cover for the booklet portion 50 and the other half thereof a cover for the ID card portion 51.

This booklet portion 50 is provided with a plurality of pages 53 having pages on which notes can be made with a pencil or pen. The pages on which notes can be made, however, may not be provided. The ID card portion 51 comprises a portion 80 constituting the cover of the booklet and serving also as the second image-recording material and a first image-recording material 10 on which an image has been recorded. The portion 80 constituting the cover and serving also as the second image-recording material is comprised of a portion 81 constituting an outermost cover, the reflective support 21, and the thermoplastic resin layer 22. The portion 81 constituting the outermost cover may be made of any materials without limitations, and there may be used materials such as synthetic leather and natural leather that may constitute a pocketbook usually available. It is preferred from the viewpoint of preventing forgery and alteration that a ground pattern or the like is previously printed on the reflective support 21 and/or thermoplastic resin layer 22. After the two image-recorded recording materials have been laminated, embossing may also be optionally made at the part as shown by 101 in FIG. 3 so that the countermeasure to prevent forgery and alteration can be more assured. It is further possible to use a hologram or the like so that the forgery and alteration can be more effectively prevented.

In the ID card and ID booklet of the present invention, the images are recorded in the first recording layer and second recording layer and the image-recorded surfaces are laminated face-to-face. The recorded images are destroyed if both materials are stripped from each other, so that forgery and alteration can be prevented more effectively. In addition, in the second recording layer, an image is recorded using the colorant having the light-absorbing power in the infrared region, and hence the information can be read by an OCR and also a high image quality can be achieved.

EXAMPLES

The present invention will be described below in greater detail by giving Examples.

EXAMPLE 1

Preparation of heat-development light-sensitive material

A heat-development color light-sensitive material having the layer constitution as shown in the following Table 1 was prepared. (The light-sensitive silver halide and silver 5-methylbenzotriazole are each indicated in the amount per 1 $m^2$ in terms of silver. The same applies in all the following Examples.)

TABLE 1

| | | |
|---|---|---|
| Protective layer: | Gelatin | 1.0 g |
| | Silica powder | 0.4 g |
| | Thermal solvent | 0.4 g |
| | Ultraviolet absorbent | 0.2 g |
| | Reducing agent | 0.2 g |
| Infrared-sensitive layer: | Infrared-sensitive silver iodobromide emulsion | 0.31 g |
| | Reducin agent | 0.38 g |
| | Gelatin | 1.7 g |
| | Silver 5-methylbenzotriazole | 0.43 g |
| | Polymeric dye-providing substance (1) | 1.1 g |
| | Thermal solvent | 1.9 g |
| Second intermediate layer: | Gelatin | 1.4 g |
| | Reducing agent | 0.35 g |
| | Ultraviolet absorbent | 0.2 g |
| Green-sensitive layer: | Green-sensitive silver iodobromide emulsion | 0.27 g |
| | Silver 5-methylbenzotriazole | 0.46 g |
| | Gelatin | 1.3 g |
| | Reducing agent | 0.26 g |
| | Polymeric dye-providing substance (2) | 0.7 g |
| | Thermal solvent | 1.8 g |
| First intermediate layer: | Gelatin | 1.6 g |
| | Reducing agent | 0.4 g |
| Red-sensitive layer: | Red-sensitive silver iodobromide emulsion | 0.43 g |
| | Silver 5-methylbenzotriazole | 0.61 g |
| | Gelatin | 1.6 g |
| | Reducing agent | 0.32 g |
| | Polymeric dye-providing substance (3) | 1.2 g |
| | Thermal solvent | 1.8 g |
| Gelatin subbing layer: | Gelatin | 1.0 g |
| | Thermal solvent | 0.3 g |
| | Reducing agent | 0.2 g |
| Latex subbing layer: | Acrylic acid latex particles | 0.05 g |
| | Gelatin | 0.05 g |
| Support: | Transparent polyethylene terephthalate film of 180 μm thick | |
| Backing layer: | Gelatin | 1.8 g |
| | Matting agent (acrylic acid latex particles; particle diameter: 4 to 8 μm) | 0.1 g |

The compounds shown in this Table 1 are shown below. Polymeric dye-providing substance (1)

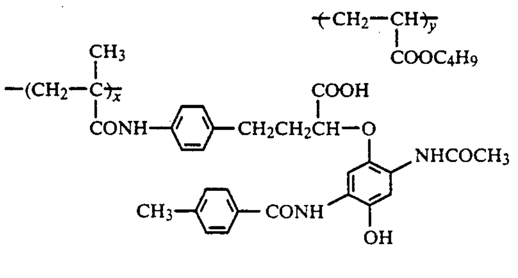

x:y = 60:40 (weight ratio)

Polymeric dye-providing substance (2)

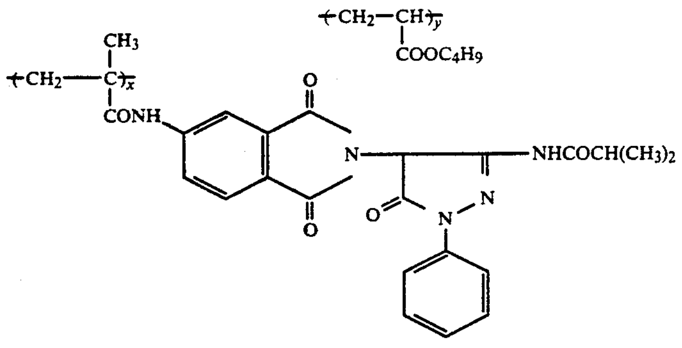

x:y = 50:50 (weight ratio)

Polymeric dye-providing substance (3)

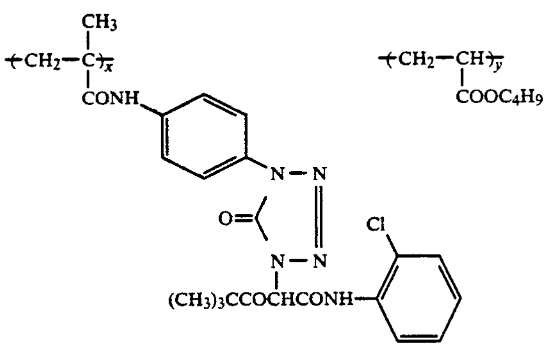

x:y = 70:30 (weight ratio)

Thermal solvent

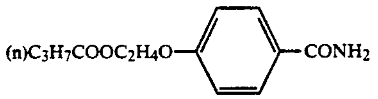

Reducing agent (A)

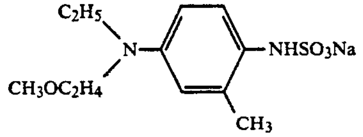

(B)

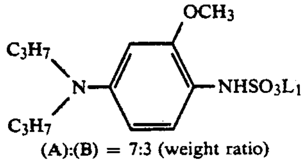

(A):(B) = 7:3 (weight ratio)

Preparation of ink sheet for sublimation thermal transfer recording

Figure 5:
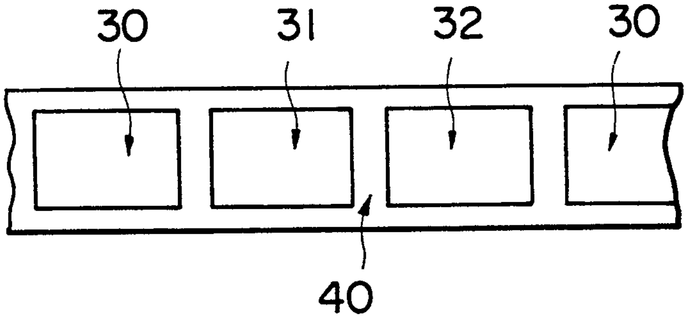
FIG. 5 illustrates the preparation of an ink sheet used for sublimation dye thermal transfer recording.

Using Y-3, M-3 and C-3 as dyes, yellow, magenta and cyan ink compositions were obtained following the method as disclosed in Japanese Patent O.P.I. Publication No. 229788/1985. Using the resulting ink compositions, yellow, magenta and cyan inks were each successively applied on a sublayered polyethylene terephthalate support of 6 μm thick by means of a gravure printer to prepare an ink sheet for sublimation thermal recording materials as shown in FIG. 5. The respective inks were applied so as to give a weight of 0.6 g for the yellow dye, 0.3 g for the magenta dye, and 0.5 g for the cyan dye.

In FIG. 5, the numeral 30 denotes a yellow ink area; 31, a magenta ink area; S2, a cyan ink area; and 40, the polyethylene terephthalate support. The polyethylene terephthalate support is provided with a heat-resistant slippery layer on its back side.

Preparation of ink ribbon for thermofusible ink transfer recording

On the polyethylene terephthalate support used in the ink sheet for sublimation thermal recording, dip coating was carried out so as to give 0.5 g of carbon black, 0.6 g of paraffin wax, 0.1 g of carnauba wax and 0.3 g of ethylene vinyl acetate to prepare an ink ribbon for thermofusible ink transfer recording.

Preparation of image-receiving material for image-recording material 1

On a transparent polyethylene terephthalate support of 100 μm thick, subbing coating was carried out to provide an image-receiving layer (the first image recording layer) having the composition as shown in Table 2. An image-receiving material 1 for the image-recording material 1 was thus prepared.

TABLE 2

(Image-receiving material for image-recording material 1)

| | Image-receiving layer composition | Image-receiving layer thickness (μm) | Center face average roughness (μm) |
|---|---|---|---|
| I-1 | Polyvinyl chloride (600)* | 8 | <0.2 |
| I-2 | Polyvinyl chloride (1,200)* | 12 | <0.2 |
| I-3 | Polycarbonate (1,000)* | 8 | <0.2 |
| I-4 | Polyisophthalate (1,000)* | 6 | <0.2 |

*Degree of polymerization

The surfaces of all the image-receiving materials above obtained have a smoothness of not less than 1,000 seconds in the Beck's smoothness.

Preparation of image-receiving material for image-recording material 2

One a 150 μm thick paper support as shown in Table 3, an image-receiving layer (the second image recording layer) as shown in Table 3 was provided by coating to prepare an image-receiving material 2 for the image-recording material 2.

TABLE 3

(Image receiving material for image-recording material 1)

| No. | Support | Image-receiving layer composition | Image-receiving layer thickness (μm) | Center face average roughness (μm) | Beck's smoothness (sec) |
|---|---|---|---|---|---|
| II-1 | Wood free paper | Polyvinyl chloride (500)* | 2 | 3.6 | 120 |
| II-2 | Wood free paper | Polyisophthalate (1,000)* | 2 | 3.0 | 150 |
| II-3 | Wood free paper | Polyisophthalate (1,000)* | 2 | 1.0 | 300 |
| II-4 | Wood free paper | Polyisophthalate (1,000)* | 8 | 0.3 | 850 |
| II-5 | Baryta paper | Polyvinyl chloride (500)* | 4 | 0.8 | 300 |
| II-6 | Baryta paper | Polyisophthalate (1,000)* | 4 | 0.6 | 400 |
| II-7 | Cast coated paper | Polyisophthalate (1,000)* | 6 | 0.2 | 1,000 |

*Degree of polymerization (1) Combination of heat-development light-sensitive material/image-receiving material 1

A heat-developable light-sensitive material was subjected to exposure using an exposure unit comprising green light (He-Ne laser, 545 nm), red light (He-Ne laser, 633 nm) and infrared light (semiconductor laser, 780 nm) based on image-processed personal data (photograph of a face) and colored background image information, and the exposed light-sensitive material was laid overlapping on the image-receiving material 1 as shown in Table 2, followed by heat-development processing at 150° C. for 1 minute and 30 seconds. Then, the image-receiving material was peeled from the light-sensitive material to obtain an image-receiving material having a sharp image.

(2) Combination of sublimation thermal transfer recording material/image-receiving material 1

Using a thermal head (8 dots/mm), and also using the ink sheet for sublimation thermal transfer recording and the image-receiving material 1 as shown in Table 2, the personal data and colored background images as used in the above (1) were recorded on the image-receiving material.

(3) Combination of thermofusible ink transfer recording material/image-receiving material 2

Personal information of characters and common information of characters, corresponding to the personal data in the above (1) or (2), were recorded as character images on the image-receiving material, by making a combination of the ink sheet for the thermofusible ink transfer recording and the image-receiving material 2 (Table 3) which were previously prepared.

(4) Adhesion by heat sealing

The color image-recorded recording material obtained in the above (1) or (2), having the photograph of a face, etc., and the image-recorded recording material obtained in the above (3), having the character images, were laid overlapping each other in the combination as shown in Table 4. A laminate material comprising a transparent polyethylene terephthalate having thereon a hot melt layer was also laid overlapping on the back paper side. These were then passed through a heating roller maintained at 160° C. to carry out laminating. Subsequently, the resulting laminate was cut to have a given size. In this way, the ID cards of the present invention were obtained.

Table 4 shows the number of blank areas at the part of the characters recorded by the thermofusible ink transfer recording, which was measured by magnifier observation of blank areas having a maximum diameter of more than 0.2 mm. ID cards that employed the recording materials II-1, -2, -3, -5 and -6 having a center face average roughness of more than 0.5 μm gave few blank areas at the part of characters and a character of high quality.

In order to evaluate the transfer performance of color images, a solid area of 1 cm×2 cm with a uniform magenta density was provided at the part of the color recorded areas, and the number of blank areas (those with a maximum diameter of more than 0.2 mm) at this part was similarly observed to make measurement. OCR reading accuracy is based on the number of cards which were able to be correctly read when 100 sheets of ID cards were each read by an OCR. The rate of the number of sheets read correctly to 100 sheets is shown in Table 4. All the resulting ID cards comprised images having the characters and the photographs of faces with a high image quality. In particular, ID cards Nos. 1, 2, 3, 4, 5, 7 and 8 showed best results.

TABLE 4

| | Image-recording material 1 | | Image recording material 2 | Number of blank | Number of blank | OCR |
|---|---|---|---|---|---|---|
| ID card No. | Recording system | Image receiving material | Image receiving material | areas at characters | areas at color images | reading accuracy |
| ID- 1 | Heat develp. | I-1 | II-1 | 0 | 0 | 99 |
| ID- 2 | Heat develp. | I-1 | II-5 | 0 | 0 | 100 |
| ID- 3 | Heat develp. | I-2 | II-5 | 0 | 0 | 98 |
| ID- 4 | Heat develp. | I-3 | II-2 | 0 | 1 | 99 |
| ID- 5 | Heat develp. | I-3 | II-6 | 1 | 0 | 97 |
| ID- 6 | Heat develp. | I-3 | II-7 | 4 | 0 | 86 |
| ID- 7 | Heat develp. | I-4 | II-2 | 0 | 1 | 99 |
| ID- 8 | Heat develp. | I-4 | II-3 | 0 | 0 | 98 |
| ID- 9 | Heat develp. | I-4 | II-4 | 3 | 0 | 90 |
| ID-10 | Heat develp. | I-4 | II-6 | 1 | 1 | 97 |
| ID-11 | Heat develp. | I-4 | II-7 | 6 | 0 | 78 |
| ID-12 | Sublimation | I-1 | II-1 | 0 | 0 | 96 |
| ID-13 | Sublimation | I-1 | II-5 | 0 | 0 | 98 |
| ID-14 | Sublimation | I-4 | II-2 | 0 | 0 | 98 |
| ID-15 | Sublimation | I-4 | II-3 | 0 | 1 | 96 |
| ID-16 | Sublimation | I-4 | II-4 | 2 | 0 | 94 |
| ID-17 | Sublimation | I-4 | II-6 | 0 | 0 | 93 |
| ID-18 | Sublimation | I-4 | II-7 | 4 | 1 | 85 |

COMPARATIVE EXAMPLE 1

The same image information as that recorded on the image-recording material 2 in Example 1, was recorded on the image-recording materials 1 (I-1 to I-4) on which the recording of the photograph of a face, etc. had already been made.

On the other hand, on a white polyester support containing barium sulfate, a thermoplastic resin layer with the same composition and film thickness as those of the image-receiving layer used in the image-recording materials was provided by coating. Image-recorded materials thus prepared and the above image-recording materials 1 were each put together so as to give the combination of thermoplastic resins having the same composition, followed by heat sealing at 160° C. ID cards 19 to 22 were thus prepared. The resulting ID cards were evaluated in the same manner as Example 1 in respect of the blank areas on characters recorded by thermofusible ink transfer recording, to obtain the results as shown in Table 5. It is seen from the results shown in Table 5 that a very large number of blank areas at the part of characters are seen and no ID card with a high image quality wa obtainable compared with the ID cards of the present invention, when two types of image recording were carried out on the first image-recording material.

TABLE 5

| ID card | Number of blank areas at characters |
|---|---|
| 19 | 24 |
| 20 | 14 |
| 21 | 12 |
| 22 | 18 |

COMPARATIVE EXAMPLE 2

In Example 1, the image information such as the photograph of a face was recorded on the image-receiving materials II-1 to II-7 used for the image-recording material 2. Next, information of characters was recorded by thermofusible ink transfer recording to prepare image-recorded recording materials.

On the other hand, prepared were laminate materials III-1 and III-2 each comprising a transparent polyester support and coated thereon the following thermoplastic resin.

Laminate materials:

III-1 Polyvinyl chloride (degree of polymerization: 500)

III-2 Polyisophthalate (degree of polymerization: 1,000)

Subsequently, the image-receiving layer surface of the above image-recorded recording materials and the thermoplastic resin layer surface of the laminate material (III-1 or III-2, in the combination as shown in Table 6) were put together. The paper side of the image-recorded material was further laid overlapping on a laminate material comprising the transparent polyethylene terephthalate as used in Example 1, having thereon a hot melt layer. These were then subjected to heat-sealing treatment at 160° C. In this way, comparative ID cards 23 to 29 were obtained.

The ID cards thus obtained were evaluated in the same manner as Example 1 by measuring the number of blank areas at the part of magenta images and at the part of characters, to obtain the results as shown in Table 6.

It is seen from the results shown in Table 6 that some of ID cards 23 to 29 are relatively good in the state of blank areas at the part of characters, but all had many blank areas at the part of color images. Thus, these ID cards can not be said to have high image quality.

TABLE 6

| ID cards | Image-recording material | Laminate material | Blank areas at characters | Blank areas at color images |
|---|---|---|---|---|
| 23 | II-1 | III-1 | 0 | 28 |
| 24 | II-2 | III-2 | 0 | 20 |
| 25 | II-3 | III-2 | 0 | 10 |
| 26 | II-4 | III-2 | 3 | 6 |
| 27 | II-5 | III-1 | 0 | 13 |
| 28 | 11-6 | 111-2 | 1 | 13 |
| 29 | II-7 | III-2 | 7 | 4 |

EXAMPLE 2

The ID cards 1 to 18 prepared in Example 1 were each tested to be peeled at the laminated part in the following methods.

(1) Tested to be peeled after heating with a drier.
(2) Tested to be peeled after immersed in acetone.
(3) Tested to be peeled after immersed in ethyl acetate.
(4) Tested to be peeled after immersed in tetrahydrofuran.

Results were as followed: In the method (1), all the ID cards 1 to 18 were unable to be peeled at the laminated part. In the methods (2) and (3), all resulted in peeling at the part of the paper. In the method (4), the laminated part was separated, but all the color images disappeared and also the characters recorded by thermofusible ink transfer recording were seriously damaged.

This shows that the ID cards of the present invention have a high resistance to alteration.

EXAMPLE 3

In Example 1, the thermofusible ink transfer recording was replaced with type setting (employing a typewriter HR-40, types OCR-B, and a type ribbon Type 7020; all manufactured by Brother Industries, Ltd.), and also the image-recorded recording materials (I-1 and I-2) and image-recorded recording material (I-4) obtained by the same heat-development recording and sublimation thermal recording, respectively, as used in Example 1 were used, and two recording materials were laminated inserting a pressure-sensitive adhesive sheet between two recording layers. As a result, there were obtained the results as shown in Table 7. From the results shown in Table 7, the effect of the present invention was confirmed to be obtainable.

The resulting ID cards were also tested to be read using an OCR that utilizes infrared light. As a result, the ID cards 30, 31, 33, 35, 36 and 37 showed a reading accuracy of almost 100%. The ID cards 32 and 33 both showed a reading accuracy of about 70%.

TABLE 7

| ID card No. | Image-recording material 1: Recording system | Image-recording material 1: Image receiving material | Image recording material 2: Image receiving material | Number of blank areas at characters | Number of blank areas at color images |
|---|---|---|---|---|---|
| 30 | Heat develp. | I-1 | 11-5 | 0 | 0 |
| 31 | " | " | II-6 | 0 | 0 |
| 32 | " | " | II-7 | 4 | 0 |
| 33 | " | I-2 | II-5 | 0 | 0 |

TABLE 7-continued

| ID card No. | Image-recording material 1 Recording system | Image-recording material 1 Image receiving material | Image recording material 2 Image receiving material | Number of blank areas at characters | Number of blank areas at color images |
|---|---|---|---|---|---|
| 34 | " | " | II-7 | 3 | 0 |
| 35 | Sublimation | I-4 | II-5 | 0 | 0 |
| 36 | " | " | II-6 | 0 | 0 |
| 37 | " | " | II-7 | 3 | 0 |

As having been described in the above, in the ID card and ID booklet of the present invention, in which the images are recorded in the first recording layer and second recording layer and the image-recorded surfaces are laminated face-to-face, the recorded images are destroyed if both layers are stripped from each other, so that forgery end alteration can be prevented more effectively, and also it is very difficult to make alteration in part. Thus, it becomes possible to obtain ID cards and ID booklets that can be forged or altered with more difficulty, making it possible to more effectively prevent the forgery and alteration. In addition, images are recorded in the second recording layer, using the colorant having the light-absorbing power or light-reflecting power in the infrared region. Hence, it is possible to readily read information also with an infrared OCR and at the same time obtain a high image quality.

EXAMPLE 4

ID card 38 was prepared in the same manner as the ID card 1 in Example 1, except that the laminating was carried out after latex comprising vinyl chloride-vinylacetate copolymer was coated as an adhesive layer on the image recording material 2. The thus obtained ID card was tested to be peeled at the laminated parts as in Example 2 and the card was unable to be peeled without destroying the image. Therefore, the card has a high resistance to alteration.

The cards 1 and 38 were kept in a bath of 80° C. for two weeks. As a result, no stain was observed in the card 1, but a little stain was observed in the card 38.

What is claimed is:

1. A method of manufacturing an identity card comprising the steps of:

forming a colorant capable of absorbing light of a visible wavelength region on a first image recording layer;

forming a colorant capable of absorbing light of an infrared wavelength region on a second image recording layer; and adhering said first and second image recording layers to each other to form a laminated structure.

2. The method of claim 1, wherein the smoothness of the surface on the image receiving layer side of said first recording layer is not less than 500 seconds according to the Beck's smoothness as defined by JIS-P-8119.

3. The method of claim 1, wherein the smoothness of the surface on the image receiving layer side of said second recording layer has a center face average roughness of not less than 0.5.

4. The method of claim 1, wherein said first image recording layer and said second image recording layer are adhered to each other by fusing with heat.

5. The method of claim 1, wherein said first image recording layer and said second image recording layer are adhered to each other by an adhesive.

6. A method of manufacturing an identity card, comprising adhering a first image recording layer comprising a colorant capable of absorbing light of a visible wavelength region provided on a first support, to a second image recording layer comprising a colorant capable of absorbing light of an infrared wavelength region provided on a second support; said first and second image recording layers being adhered to each other in face-to-face contact to form a laminated structure.

7. The method of claim 6, wherein said colorant capable of absorbing light of a visible wavelength region is a colorant thermally transferred.

8. The method of claim 6, wherein said colorant capable of absorbing light of a visible wavelength region is a colorant thermally transferred by sublimation.

9. The method of claim 7, wherein said colorant thermally transferred is a colorant formed by heat development.

10. The method of claim 6, wherein said first image recording layer comprises one selected from the group consisting of polycarbonate, polyester, polyurethane, polyvinylchloride, polycaprolactam and copolystyrene-acrylonitrile.

11. The method of claim 10, wherein the number average molecular weight of said polycarbonate, polyester, polyurethane, polyvinylchloride, polycaprolactam and copolystyrene-acrylonitrile is from 10,000 to 500,000.

12. The method of claim 6, wherein said second image recording layer comprises at least one thermoplastic resin selected from the group consisting of ethylene copolymers, polyamide resins, polycarbonate resins, polyester resins, polyurethane resins, polyolefine resins, polyacrylate resins, polyvinylchloride resins, cellulose resins, rosin resins, petroleum resins, ionomers, natural rubber, styrene-butadiene rubber, isoprene rubber, chloroprene rubber, diene copolymers, ester gum, rosin-maleic acid resin, rosin-phenol resin, hydrogenated rosin, phenol resin, terpene resin, cyclopentadiene resin and aromatic hydrocarbon resins.

13. The method of claim 6, wherein said colorant capable of absorbing light of an infrared wavelength region is a colorant printed by type.

14. The method of claim 6, wherein said colorant capable of absorbing light of an infrared wavelength region is an organic pigment or an inorganic pigment.

15. The method of claim 14, wherein said inorganic pigment is one selected from carbon black, a metal and a metal oxide.

16. The method of claim 6, wherein said first image recording layer and said second image recording layer are adhered to each other by fusing with heat.

17. The method of claim 6, wherein said first image recording layer and said second image recording layer are adhered to each other by an adhesive.

18. The method of claim 17, wherein said adhesive is one selected from the group consisting of hot melt type adhesives, themoplastic resin adhesives, rubber adhesives, thermo-curing resin adhesives, photo-curing resin adhesives and natural product adhesives.

19. The method of claim 6, wherein said second image recording layer comprises at least one thermoplastic resin selected from the group consisting of polycarbonates, polyesters, polyacrylates and polyvinylchlorides.

20. The method of claim 6, wherein said second support itself is a second image recording layer.

* * * * *